(12) United States Patent  (10) Patent No.: US 8,930,971 B1
Pinkovezky et al.  (45) Date of Patent: Jan. 6, 2015

(54) EMBEDDED-ADVERTISING CONTENT PRESENTED IN DOCUMENT CONTEXT (71) Applicant: LinkedIn Corporation, Mountain View, CA (US)

(72) Inventors: Aviad Pinkovezky, Los Altos, CA (US); Kevin R. Mikles, San Francisco, CA (US); Eldo K. Cherian, San Francisco, CA (US); Kancheng Cao, Cupertino, CA (US); Meera G. Bhatia, San Francisco, CA (US); Sanjay Kshetramade, Fremont, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/216,894

(22) Filed: Mar. 17, 2014

Related U.S. Application Data (63) Continuation-in-part of application No. 14/025,825, filed on Sep. 13, 2013.

(60) Provisional application No. 61/946,530, filed on Feb. 28, 2014.

(51) Int. Cl.
G06F 9/44 (2006.01)
G06Q 30/00 (2012.01)
G06Q 30/02 (2012.01)

(52) U.S. Cl.
CPC .................................. G06Q 30/0277 (2013.01)
USPC .......................................... 719/329; 705/14.4

(58) Field of Classification Search
None
See application file for complete search history.

(56) References Cited

U.S. PATENT DOCUMENTS

| 8,423,651 | B1* | 4/2013 | Grieve et al. ................... 709/227 |
| 2008/0313648 | A1* | 12/2008 | Wang et al. .................... 719/315 |
| 2009/0299862 | A1* | 12/2009 | Fan et al. ..................... 705/14.73 |
| 2010/0107088 | A1* | 4/2010 | Hunt et al. ...................... 715/752 |
| 2010/0299205 | A1* | 11/2010 | Erdmann et al. ............ 705/14.54 |
| 2012/0084641 | A1* | 4/2012 | Chung et al. ................... 715/240 |
| 2012/0246017 | A1* | 9/2012 | Kleber ........................ 705/14.73 |
| 2012/0317238 | A1* | 12/2012 | Beard ............................ 709/219 |
| 2013/0239196 | A1* | 9/2013 | Smith et al. ....................... 726/9 |
| 2013/0326617 | A1* | 12/2013 | Hansen ............................ 726/22 |

* cited by examiner

Primary Examiner — Charles E Anya
(74) Attorney, Agent, or Firm — Park, Vaughan, Fleming & Dowler LLP; Steven E. Stupp (57) ABSTRACT A user may activate an embedded advertisement in an embedded window in a document, such as a web page. This embedded advertisement may be associated with a domain (a granddaughter domain) that is different than the domain associated with the embedded window (a daughter domain) and the domain associated with the document (a parent domain). In older browsers, cross-domain communication may not be supported in this circumstance. This problem is solved by opening a series of windows from the granddaughter domain, each of which is associated with a candidate origin of the document. Then, access commands associated with the windows are communicated to the domain of the document. Only the access command for the window having the correct origin of the domain of the document is processed, which results in content associated with the embedded advertisement being linked at a source and presented or displayed in the embedded advertisement.

17 Claims, 4 Drawing Sheets

EMBEDDED-ADVERTISING CONTENT PRESENTED IN DOCUMENT CONTEXT

CROSS-REFERENCE TO RELATED APPLICATION

This application claims priority under 35 U.S.C. §120 as a Continuation-in-Part patent application of U.S. patent application Ser. No. 14/025,825, entitled "Cross-Document Communication," by Kevin Mikles, filed on Sep. 13, 2013, the contents of which are herein incorporated by reference. The present application further claims priority under 35 U.S.C. §119 to U.S. Provisional Patent Application No. 61/946,530, entitled "Embedded-Advertising Content Presented in Document Context," by Aviad Pinkovezky, Kevin R. Mikles, Eldo K. Cherian, Kancheng Cao, Meera G. Bhatia and Sanjay Kshetramade, filed 28 Feb. 2014, the contents of which are herein incorporated by reference.

BACKGROUND

1. Field

The described embodiments relate to techniques for providing content associated with embedded advertising in the context of a parent document. More specifically, the described embodiments relate to techniques for providing content, such as presentations or video, associated with embedded advertising in the context or the environment of a web page or a website.

2. Related Art

Many web pages and websites include advertisements. For example, a web page may include a link to content associated with an advertisement. If a user activates the link, the content is displayed.

However, the content is often displayed separately from the original web page. In particular, the original web page may be displayed in one tab of a browser, while the advertising content may be displayed in a separate tab that is in or that is associated with another web page that includes the content. This technique for displaying the content separate from the original web page may cause the connection or relationship between the original web page and the advertisement to be lost. In addition, the content is usually either static or, in the case of video, has limited functionality. These limitations often restrict the overall user experience when viewing and, more generally, interacting with the content. Consequently, existing advertising techniques may adversely impact click-through rates and conversion rates.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for providing content, and a computer-program product (e.g., software) for use with the computer system are described. According to this communication technique, a user activates an embedded advertisement in an embedded window in a document, such as a web page. The embedded advertisement may be associated with a domain (a granddaughter domain) that is different than the domain associated with the embedded window (a daughter domain) and the domain associated with the document (a first, original, or parent domain). In older browsers, cross-domain or cross-document communication may not be supported in this circumstance.

This problem is solved by opening a series of windows from the granddaughter domain, each of which is associated with a candidate origin of the document, such as different forms of the document address. Then, access commands associated with the windows are communicated to the document. Only the access command for the window having the correct origin of the document (i.e., the same network address, port, protocol or scheme, and/or hostname as the document) is processed. The other access commands fail. When the successful access command is processed by a cross-domain communication module executing in an environment of the original document (such as a browser), content associated with the embedded advertisement may be linked at a source and presented or displayed in the embedded advertisement.

In this way, the communication technique may allow the context or the environment of the document (such as interactions with other users of the same web page) to be available when providing the content associated with the embedded advertisement. For example, the web page may be associated with a social network, and the communication technique may allow content (such as presentations) to be presented to other users or shared among the users of the web page without requiring that the users access the content on a different web page. By leveraging the context, the communication technique may provide various benefits: enhanced interaction with the content, more interesting/relevant advertisements, and/or improved advertisement distribution. Thus, the communication technique may extend the reach of the advertisement, improve the overall user experience when viewing or interacting with advertisements, and/or increase click-through rates and conversion rates. Consequently, the communication technique may increase commercial activity.

In the discussion that follows, an individual, a user or a recipient of the content may include a person (for example, an existing customer, a new customer, a student, an employer, a supplier, a service provider, a vendor, a contractor, etc.). More generally, the communication technique may be used by an organization, a business and/or a government agency. Furthermore, a 'business' should be understood to include for-profit corporations, non-profit corporations, groups (or cohorts) of individuals, sole proprietorships, government agencies, partnerships, etc.

Figure 1:
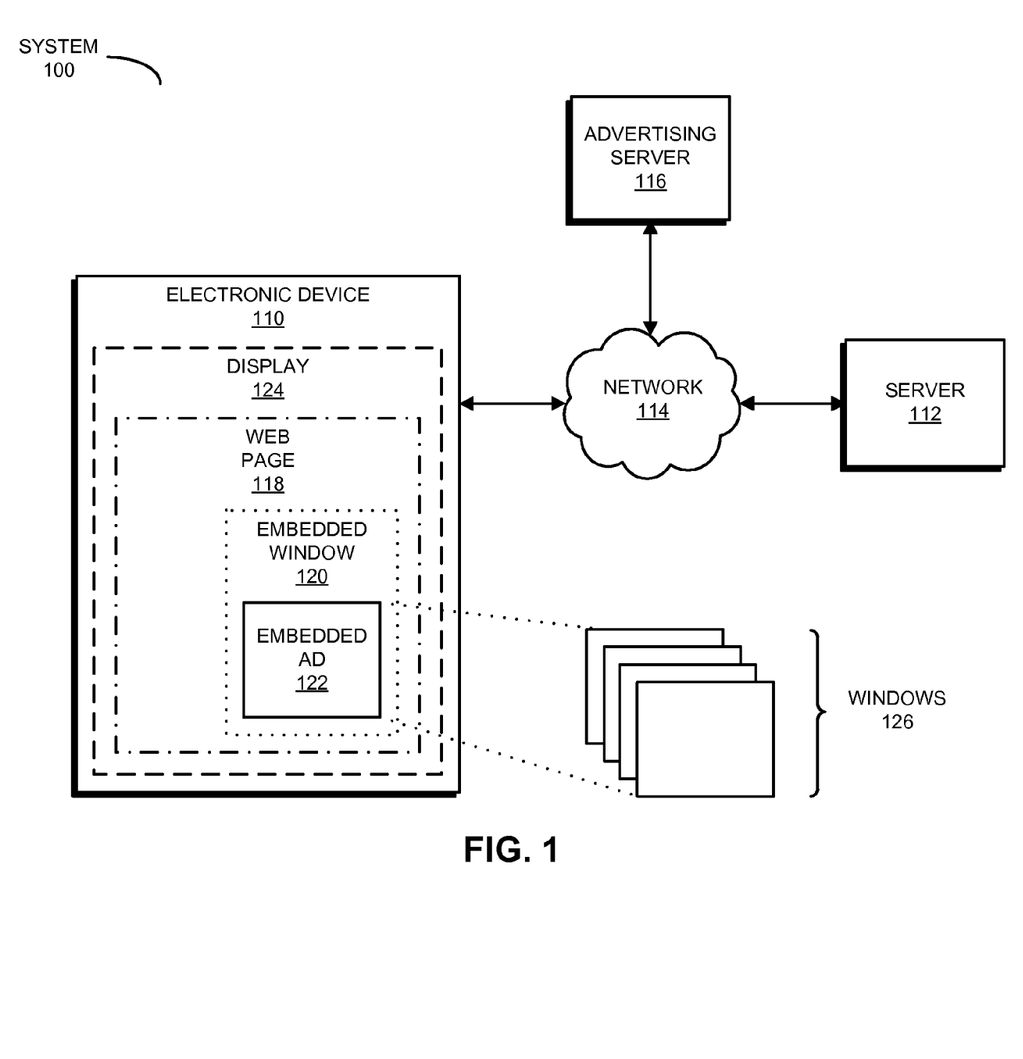
FIG. 1 is a block diagram illustrating a system that provides content in accordance with an embodiment of the present disclosure.

We now describe embodiments of the system. FIG. 1 presents a block diagram illustrating a system 100 that provides content. In this system, server 112 hosts a web page 118 (and, more generally, a document) that can include embedded advertising (and, more generally, the content). When a user of electronic device 110 accesses, via network 114, a location (such as a uniform resource locator or URL) associated with web page 118, server 112 may receive target information (such as an identifier of electronic device 110, a geographic location of electronic device 110, information in a profile of the user associated with an account of the user, etc.).

This target information may be used to select or tailor advertising for inclusion in web page 118. In particular, server 112 may provide, via network 114, the target information to advertising server 116 (which is associated with one or more advertising providers), and advertising server 116 may select or tailor the advertising (which is sometimes referred to as 'targeted advertising') for the user. For example, the targeted advertising may include the content. Advertising server 116 may provide, via network 114, this targeted advertising to server 112. Advertising server 116 and server 112 may or may not be operated by or on behalf of a single organization.

Then, server 112 may include the targeted advertising in a portion of web page 118. For example, web page 118 may include an embedded window 120 (and, more generally, an embedded document) associated with the advertising provider, and embedded window 120 may include an embedded advertisement (or ad) 122 that includes or is populated with the targeted advertising or the content. In particular, embedded window 120 may be a frame (such as an HTML iframe) within web page 118, and embedded ad 122 may be another frame within embedded window 120. Note that each frame is an element, within web page 118 (and, more generally, a document), which refers to another document that is rendered as a web page. Thus, one or more web pages may be contained or nested within web page 118.

Next, server 112 may provide, via network 114, web page 118 to electronic device 110. This web page may be rendered by a browser on electronic device 110, which displays web page 118 to the user on a display 124 in electronic device 110. In particular, when processed by the browser, text and code (such as HTML code, XML code, JavaScript, etc.) in web page 118 is rendered on display 124.

By embedding the content in web page 118, it can be presented to the user in the context or environment of web page 118 when the user activates embedded ad 122, e.g., when the user activates a link included in the embedded ad. Thus, the content can be displayed in embedded window 120 in web page 118, as opposed to being presented in a separate tab. Moreover, the user can interact with the 'daughter,' 'nested' or 'child' document (i.e., embedded ad 122) without requiring the 'root' or 'parent' document (i.e., web page 118) to be refreshed. This is because a frame embedded in web page 118 can display video, audio, text, graphics, multimedia and/or a web page (and, more generally, content) independently of its container or source, i.e., a remainder of web page 118.

However, this may require cross-domain (or cross-origin) communication among web page 118, embedded window 120 and/or embedded ad 122, which are arranged in a hierarchy. In particular, web page 118 may be associated with a domain (which is sometimes referred to as an 'origin' or 'source') of server 112 (e.g., the URL or a subdomain), while embedded window 120 may be associated with a domain of advertising server 116 and embedded ad 122 may be associated with a domain of the advertiser (which may be included or hosted on advertising server 116 or on another server, not shown in FIG. 1). Note that the cross-domain communication among web page 118, embedded window 120 and/or embedded ad 122 may be unidirectional or bidirectional, and/or may occur directly or indirectly via an intermediary.

In the case of more modern or recent versions of the browser, this cross-domain communication can be implemented using a messaging application programming interface (API). For example, in HTML5 the messaging API includes a JavaScript API (postMessage) that allows messages to be sent from one origin/domain to another (and, thus, from embedded ad 122 to web page 118). The messages can be posted to: other frames or iframes within the window of the sender document; windows the sender document explicitly opens through JavaScript calls; the parent window of the sender document; and/or the window that opened the sender document.

Moreover, a given message may include: a source of the message (i.e., where the message came from), including the port number, the subdomain and the protocol, such as HTTP or HTTPS; a destination of the message (which tells a recipient whether to process the message or to forward it); and the data or content in the message. This information in the given message may be included in a JavaScript Object Notation (JSON) string. In some embodiments, security associated with the cross-domain communication is enhanced by communicating secure hashes of the domains, which are generated using a cryptographic hash function (such as MD5, SHA-1 or SHA-2). In these embodiments, the parent, daughter and granddaughter documents look up the secure hashes of the domains in a white list for use in messages. Thus, a recipient (such as web page 118) of a message from embedded ad 122 may compare the securely hashed destination in the message with those in the white list and, if there is a match, the recipient processes the message.

However, prior to HTML5, browsers prevented cross-domain communication between different portions of a document (such as embedded ad 122 and web page 118) that have different domains or origins (i.e., these browsers may not support postMessage). For example, this may be a problem in the Internet Explorer (IE) 7 browser (from Microsoft Corp. of Redmond, Wash.) and/or others. This problem may be addressed using a communication technique provided herein.

Using communication between embedded ad 122 and web page 118 as an illustration, when the user activates embedded ad 122 (e.g., by activating a link, such as clicking on a link using a mouse or touching the link on a touchscreen), embedded ad 122 determines if the domain of web page 118 is different than the domain of embedded ad 122. For example, embedded ad 122 may invoke, in a command, a cross-domain communication module that executes in an environment of the domain of web page 118 (such as the browser). This invoking may fail if the origins are different. Note that the cross-domain communication module may include a JavaScript library that enables the cross-domain communication, and the command may be specified using a JSON string.

Then, embedded ad 122 may optionally determine if web page 118 and/or the browser supports a cross-domain communication technique, such as postMessage. If not, embedded ad 122 may continue with the communication technique.

According to some implementations, embedded ad 122 opens a series of windows 126 corresponding to different candidate origins of the origin of the domain of web page 118. In some embodiments, embedded ad 122 obtains the candidate origins by accessing a list of predefined candidate origins of the domain of web page 118. Note that the candidate origins may have different protocols or schemes, different port numbers, different network addresses, different hostnames, different subdomains, and/or other differences.

When embedded ad 122 communicates or invokes access commands associated with windows 126 for web page 118, only the access command for one of windows 126 is processed by the cross-domain communication module. In particular, a given access command (which may be specified using a JSON string) may include a given candidate origin, a content identifier for content associated with embedded ad 122, and a source location of the content. The cross-domain communication module may only process the access command having a candidate origin that matches the actual origin (such as the URL) of the domain of web page 118. All the other access commands for the other windows 126 may fail. This failure may be graceful (the associated access commands are not processed and the windows are not displayed). Furthermore, when the cross-domain communication module processes the access command having the correct origin of the domain of web page 118, the content associated with embedded ad 122 may be linked at the source and presented or displayed in embedded ad 122.

In this way, the communication technique may allow cross-domain communication even in browsers that do not support postMessage. Therefore, the communication technique may allow the content to be presented in the context of web page 118. This may allow information or knowledge associated with web page 118 to be used when presenting the content. For example, web page 118 may be associated with a social network of individuals and groups of individuals (e.g., organizations, companies, educational institutions, entities, etc.), such as individuals (or users of the social network) that have professional or business relationships with each other.

Moreover, the individuals may have accounts with the social network with associated profiles. These profiles may include personal and/or business information such as work histories, education histories, lists of skills (or attributes of the individuals), and/or 'connections' (or interrelationships) among the individuals. By presenting the content in the professional or business context of web page 118, this context can be leveraged to provide the content to individuals at appropriate times. Thus, the context can be used to provide more unique or interesting advertising, which may improve the click-through rate and the conversion rate. In addition, the content can be presented seamlessly within web page 118, so that there is a common context or experience, including a common look and feel. In an exemplary embodiment, the content includes shared presentations (which may be SlideShare presentations available at a URL corresponding to www.slideshare.net). These shared presentations may be associated with recruiting by an organization or a job search by an individual or, more generally, the content may include commercials, news, previous work of an individual, insightful content, interviews, trends in marketing, designs, how-to demonstrations, etc.

While the preceding example included a separate advertising server 116, in other embodiments the functions of advertising server 116 and server 112 may be combined. For example, server 112 may use the target information to select or tailor the advertising for the user. Furthermore, while frames were used as illustrations of the embedded window 120 and embedded ad 122, in other embodiments the portions of web page 118 associated with other domains include pop-up or pop-under windows. As described further below with reference to FIG. 3, in some embodiments the communication technique is implemented using a client-server architecture in which the user interacts with web page 118 that is provided by via network 114, and which is rendered by a browser on electronic device 110.

In some embodiments, at least some of the operations in the communication technique are performed by an application tool that is embedded in web page 118, and which executes in a virtual environment of the browser. Alternatively, in other embodiments at least some of the operations in the communication technique are performed by a software product or application that is resident on and that executes on electronic device 110. The application operated by the user may be a standalone application or a portion of another application that is resident on and which executes on electronic device 110 (such as an application that is provided by server 112 or that is installed and which executes on electronic device 110).

Note that information in system 100 may be stored at one or more locations in system 100 (i.e., locally and/or remotely). Moreover, because this data may be sensitive in nature, it may be encrypted. For example, stored data and/or data communicated via network 114 may be encrypted.

Figure 2:
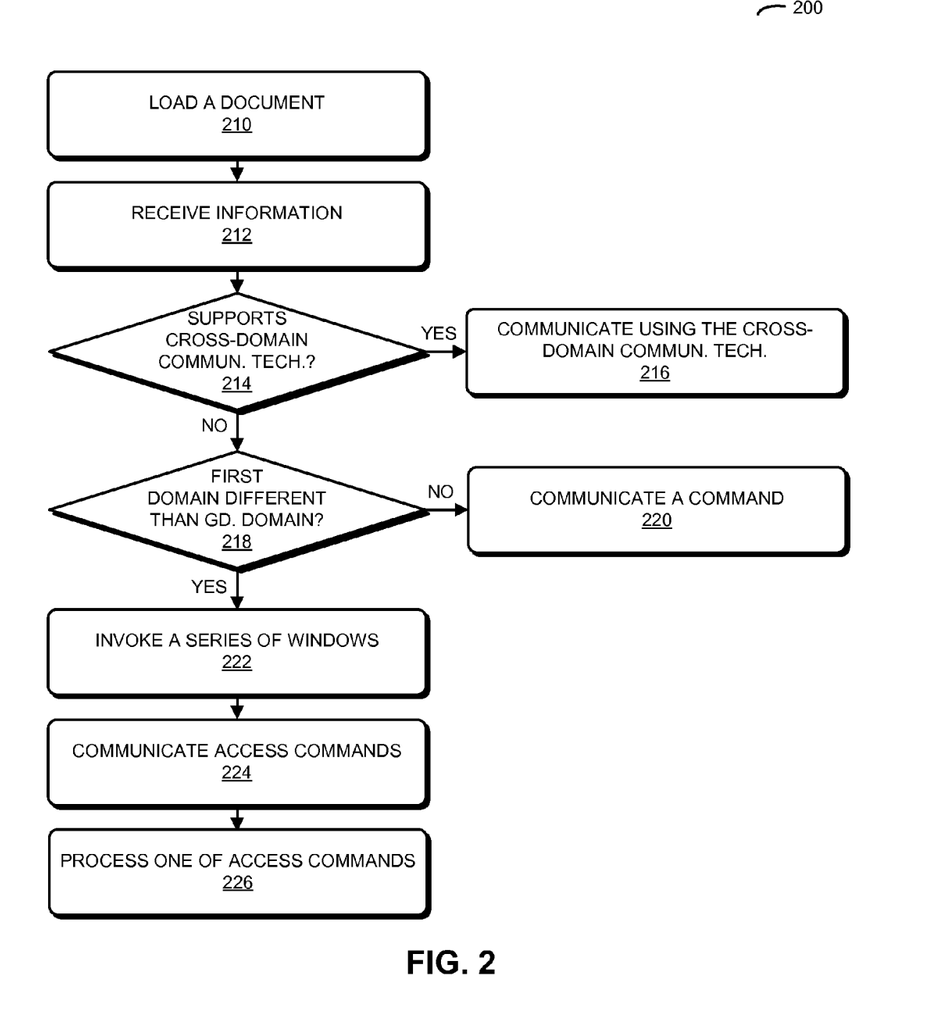
FIG. 2 is a flow chart illustrating a method for providing content in accordance with an embodiment of the present disclosure.

FIG. 2 presents a flow chart illustrating a method 200 for providing content, which may be performed by a computer system (such as electronic device 110 and server 112 in FIG. 1).

During operation, the computer system loads a document (operation 210) associated with a first domain, where the document includes an embedded document (such as embedded window 120 in FIG. 1) that is associated with a daughter domain, and the embedded document includes an embedded advertisement (such as embedded ad 122 in FIG. 1) that is associated with a granddaughter domain. For example, the document may be a web page (such as web page 118 in FIG. 1), and the embedded document and the embedded advertisement may be iframes.

Then, the computer system receives information (operation 212) in the granddaughter domain indicating that a viewer of the document activated the embedded advertisement. For example, the user may click on a link in embedded ad 122 in FIG. 1.

In response to receiving the information (operation 212), the computer system optionally determines if the document supports a cross-domain communication technique (operation 214), such as postMessage. If yes (operation 214), the embedded advertisement in the granddaughter domain may communicate with the document in the first domain using the cross-domain communication technique (operation 216), which results in the content (such as video and/or a presentation) being linked at a source location and being displayed in a window in the embedded advertisement. If the document does not support the cross-domain communication technique (operation 214), the computer system determines if the first domain is different than the granddaughter (gd.) domain (operation 218). For example, the computer system may invoke, in a command, a cross-domain communication module executing in an environment of the first domain (such as IE 7). This command may fail if the first domain is different than the granddaughter domain.

If the first domain is the same as the granddaughter domain (operation 218), the computer system may communicate a command associated with the embedded advertisement directly with the document (operation 220), which results in the content being linked at the source location and being displayed in a window in the embedded advertisement.

Alternatively, if the first domain is different than the granddaughter domain (operation 218), the computer system invokes, in the granddaughter domain, a series of windows (operation 222) corresponding to different candidate origins of the first domain. For example, the computer system may access a list of predefined candidate origins of the first domain that was included as part of embedded ad 122 or embedded window 120. Note that, relative to each other, the candidate origins of the first domain may have different protocols, different port numbers, different subdomains, and/or some other difference(s). In some embodiments, these windows are not visible to a user to whom the document was presented.

Next, the computer system communicates access commands (operation 224) associated with the windows to the document, where a given access command includes one of the candidate origins, a content identifier for content associated with the embedded advertisement, and the source location of the content. Note that the access commands may be compatible with or formatted according to JSON.

Those access commands with incorrect candidate origins fail. Only one of the access commands has the correct candidate origin that is the same as that of the first domain of the document. The computer system processes this access command (operation 226) using the cross-domain communication module that executes in the environment of the first domain, which results in the content being linked at the source location and being displayed in the window corresponding to the processed access command.

Figure 3:
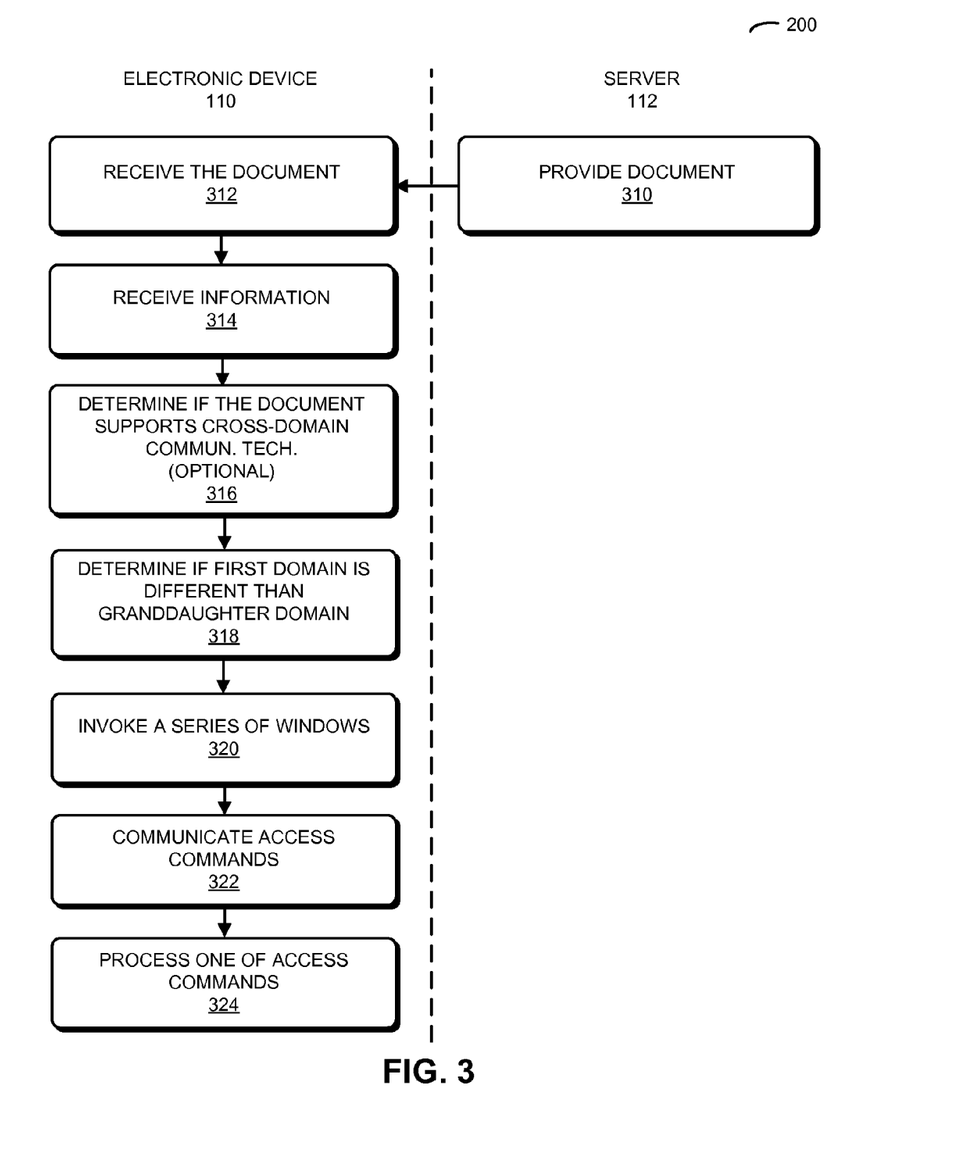
FIG. 3 is a flow chart further illustrating the method of FIG. 2 in accordance with an embodiment of the present disclosure.

In an exemplary embodiment, the communication technique is implemented using an electronic device (such as a computer, a cellular telephone and/or a portable electronic device) and two or more servers, which communicate through a network, such as a cellular-telephone network and/or the Internet (e.g., using a client-server architecture). This is illustrated in FIG. 3, which presents a flow chart illustrating method 200 (FIG. 2). During this method, server 112 may provide (operation 310) and electronic device 110 may receive (operation 312) the document (such as web page 118 in FIG. 1).

In response to receiving (operation 314) information indicating a user of electronic device 110 activated an embedded advertisement in the document, electronic device 110 optionally determines if the document supports the cross-domain communication technique (operation 316). Then, electronic device 110 determines if the first domain is different than the granddaughter domain (operation 318).

Next, electronic device 110 invokes, in the granddaughter domain, a series of windows (operation 320) corresponding to different candidate origins of the first domain. Furthermore, electronic device 110 communicates access commands (operation 322) associated with the windows to the document. Electronic device 110 processes the one access command with the correct candidate origin (operation 324) (i.e., the same origin as the first domain of the document) using the cross-domain communication module that executes in the environment of the first domain, which results in the content being linked at the source location and being displayed in the window corresponding to the processed access command.

In some embodiments of method 200 (FIGS. 2 and 3), there may be additional or fewer operations. Moreover, the order of the operations may be changed, and/or two or more operations may be combined into a single operation.

Figure 4:
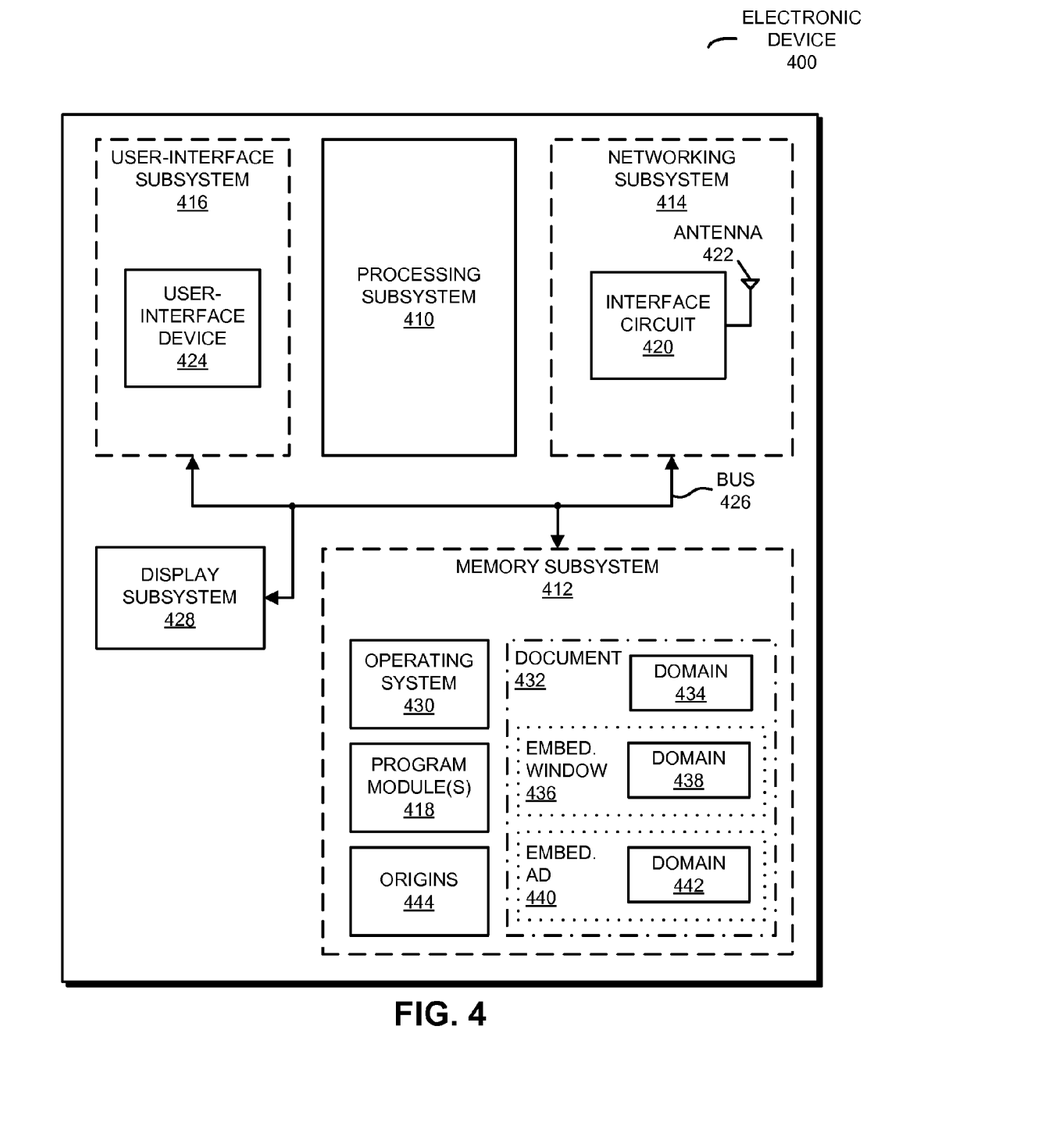
FIG. 4 is a block diagram illustrating an electronic device that performs the method of FIGS. 2 and 3 in accordance with an embodiment of the present disclosure.

We now describe embodiments of the electronic device. FIG. 4 presents a block diagram illustrating electronic device 400. This electronic device includes processing subsystem 410, memory subsystem 412, networking subsystem 414, user-interface subsystem 416, and display subsystem 428. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for use by processing subsystem 410, networking subsystem 414, and/or user-interface subsystem 416. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as one or more program modules 418, e.g., a browser), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including an interface circuit 420 and an antenna 422. For example, networking subsystem 414 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Moreover, networking subsystem 414 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between electronic device 110 and server 112 (FIG. 1), e.g., transmitting advertising frames and/or near-field communication.

User-interface subsystem 416 may include one or more processors, controllers and devices for receiving the information from a user of electronic device 400 (such as account information), and for securely communicating this information to processing subsystem 410. For example, the information may include account information (such as a username and a password), which is received using a user-interface device 424 (such as a keypad, a keyboard, a pointer, a mouse, a touch-sensitive display, optical character recognition and/or voice recognition).

During operation of electronic device 400, electronic device 400 receives, via networking subsystem 414, instructions for document 432 (such as a web page) associated with domain 434, where document 432 includes an embedded window (embed. window) 436 associated with domain 438, and embedded window 436 includes an embedded advertisement (embed. ad) 440 associated with domain 442.

In response to receiving information indicating that a user of electronic device 400 activated embedded ad 440 in document 432, one of the one or more program modules 418 (such as a module that is executed by a browser) optionally determines if document 432 supports a cross-domain communication technique. Then, the program module determines if domain 434 is different than domain 442.

Next, the program module invokes, in domain 442, a series of windows corresponding to different candidate origins 444 of domain 434. Furthermore, the program module communicates access commands associated with the windows to document 432 via the windows. For the one access command with the correct candidate origin (i.e., the same origin as domain 434 of document 432), another of the one or more program modules 418 (such as a cross-domain communication module that is executed by the browser) processes this access command. This results in content being linked at a source location and being displayed in the window (in document 432) corresponding to the processed access command.

Within electronic device 400, processing subsystem 410, memory subsystem 412, networking subsystem 414, and user-interface subsystem 416 may be coupled using one or more interconnects, such as bus 426. These interconnects may include an electrical, optical, and/or electro-optical connection that the subsystems can use to communicate commands and data among one another. Note that different embodiments can include a different number or configuration of electrical, optical, and/or electro-optical connections among the subsystems.

In some embodiments, display subsystem 428 may include a display driver for displaying information on a display component, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device. Moreover, network 114 (FIG. 1) may include the Internet, World Wide Web (WWW), an intranet, a cellular-telephone network, LAN, WAN, MAN, or a combination of networks, or other technology enabling communication between computing systems.

Although specific components are used to describe electronic device 400, in alternative embodiments different components and/or subsystems may be present in electronic device 400. For example, electronic device 400 may include one or more additional processing subsystems, memory subsystems, networking subsystems, and/or user-interface subsystems. Additionally, one or more of the subsystems may not be present in electronic device 400. Moreover, in some embodiments, electronic device 400 may include one or more additional subsystems that are not shown in FIG. 4. For example, electronic device 400 can include a data collection subsystem, an audio and/or video subsystem, an alarm subsystem, a media processing subsystem, and/or some other subsystem not already mentioned. Also, although separate subsystems are shown in FIG. 4, in some embodiments, some or all of a given subsystem or component can be integrated into one or more of the other subsystems or components in electronic device 400. For example, in some embodiments the one or more program modules 418 are included in operating system 430.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Furthermore, while the preceding discussion focused on the hardware, software and functionality in electronic device 400, server 112 (FIG. 1) and/or advertising server 116 (FIG. 1) may have the same or similar hardware (processors, memory, networking interfaces, etc.) and/or software to support the operations performed by these entities. In particular, these entities may include one or more computer systems with a processing subsystem that executes one or more program modules stored in a memory subsystem to perform the operations, and one or more networking interfaces for communicating with other electronic devices, such as electronic device 400.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for providing content, the method comprising:
    using the computer system, loading a document associated with a first domain, wherein the document includes an embedded document associated with a daughter domain, and wherein the embedded document includes an embedded advertisement associated with a granddaughter domain;
    receiving information in the granddaughter domain indicating that a viewer of the document activated the embedded advertisement;

in response to receiving the information, determining if the document supports a cross-domain communication technique;

if the document does not support the cross-domain communication technique, determining if the first domain is different than the granddaughter domain;

if the first domain is different than the granddaughter domain, invoking, in the granddaughter domain, a series of windows corresponding to different candidate origins of the first domain;

communicating access commands associated with the windows from the granddaughter domain to the document associated with the first domain, wherein a given access command includes one of the candidate origins, a content identifier for content associated with the embedded advertisement and a source location of the content; and processing one of the access commands having a candidate origin that is the same as that of the first domain using a cross-domain communication module executing in an environment of the first domain, wherein the processing involves linking to the content at the source location, which is displayed in one of the windows associated with the one of the access commands.

2. The method of claim 1, wherein the determining involves invoking, in a command, the cross-domain communication module; and wherein the invoking fails if the first domain is different than the granddaughter domain.

3. The method of claim 1, wherein the cross-domain communication technique includes postMessage.

4. The method of claim 1, wherein the windows include iframes.

5. The method of claim 1, wherein, prior to invoking the series of windows, the method further comprises accessing a list of predefined candidate origins of the first domain.

6. The method of claim 1, wherein, relative to each other, the candidate origins of the first domain have one of: different protocols, different port numbers and different subdomains.

7. The method of claim 1, wherein the content includes one of: a video, and a presentation.

8. The method of claim 1, wherein the access commands are compatible with JAVASCRIPT OBJECT NOTATION.

9. The method of claim 1, wherein the document includes a web page; and wherein the environment of the first domain includes INTERNET EXPLORER 7.

10. A computer-program product for use in conjunction with a computer system, the computer-program product comprising a non-transitory computer-readable storage medium and a computer-program mechanism embedded therein, to provide content, the computer-program mechanism including:

instructions for loading a document associated with a first domain, wherein the document includes an embedded document associated with a daughter domain, and wherein the embedded document includes an embedded advertisement associated with a granddaughter domain;

instructions for receiving information in the granddaughter domain indicating that a viewer of the document activated the embedded advertisement;

instructions for determining if the document supports a cross-domain communication technique in response to receiving the information;

instructions for determining if the first domain is different than the granddaughter domain in response to receiving the information if the document does not support the cross-domain communication technique;

instructions for invoking, in the granddaughter domain if the first domain is different than the granddaughter domain, a series of windows corresponding to different candidate origins of the first domain;

instructions for communicating access commands associated with the windows from the granddaughter domain to the document associated with the first domain, wherein a given access command includes one of the candidate origins, a content identifier for content associated with the embedded advertisement and a source location of the content; and instructions for processing one of the access commands having a candidate origin that is the same as that of the first domain using a cross-domain communication module executing in an environment of the first domain, wherein the processing involves linking to the content at the source location, which is displayed in one of the windows associated with the one of the access commands.

11. The computer-program product of claim 10, wherein the instructions for determining include instructions for invoking, in a command, the cross-domain communication module; and wherein the instructions for invoking fail if the first domain is different than the granddaughter domain.

12. The computer-program product of claim 10, wherein, prior to the instructions for invoking the series of windows, the computer-program mechanism further comprises instructions for accessing a list of predefined candidate origins of the first domain.

13. The computer-program product of claim 10, wherein the access commands are compatible with JAVASCRIPT OBJECT NOTATION.

14. A computer system, comprising:

a processor;

memory; and a program module, wherein the program module is stored in the memory and configurable to be executed by the processor to provide content, the program module including:

instructions for loading a document associated with a first domain, wherein the document includes an embedded document associated with a daughter domain, and wherein the embedded document includes an embedded advertisement associated with a granddaughter domain;

instructions for receiving information in the granddaughter domain indicating that a viewer of the document activated the embedded advertisement;

instructions for determining if the document supports a cross-domain communication technique in response to receiving the information;

instructions for determining if the first domain is different than the granddaughter domain in response to receiving the information if the document does not support the cross-domain communication technique;

instructions for invoking, in the granddaughter domain if the first domain is different than the granddaughter domain, a series of windows corresponding to different candidate origins of the first domain;

instructions for communicating access commands associated with the windows from the granddaughter domain to the document associated with the first domain, wherein a given access command includes one of the candidate origins, a content identifier for content associated with the embedded advertisement and a source location of the content; and instructions for processing one of the access commands having a candidate origin that is the same as that of the first domain using a cross-domain communication module executing in an environment of the first domain, wherein the processing involves linking to the content at the source location, which is displayed in one of the windows associated with the one of the access commands.

15. The computer system of claim 14, wherein the instructions for determining include instructions for invoking, in a command, the cross-domain communication module; and
wherein the instructions for invoking fail if the first domain is different than the granddaughter domain.

16. The computer system of claim 14, wherein, prior to the instructions for invoking the series of windows, the program module further comprises instructions for accessing a list of predefined candidate origins of the first domain.

17. The computer system of claim 14, wherein the access commands are compatible with JAVASCRIPT OBJECT NOTATION.

* * * * *